United States Patent [19]

Haefner et al.

[11] Patent Number: 4,849,601

[45] Date of Patent: Jul. 18, 1989

[54] CURRENT-LOOP FEEDBACK OF SPOT WELDING MACHINES

[75] Inventors: Kenneth B. Haefner, Schenectady, N.Y.; Thomas P. Povlick, La Puento, Calif.

[73] Assignee: General Electric Company, Schenectady, N.Y.

[21] Appl. No.: 229,402

[22] Filed: Aug. 8, 1988

[51] Int. Cl.$^4$ ............................................... B23K 11/24
[52] U.S. Cl. .................................................... 219/110
[58] Field of Search ...................... 219/110, 114, 117.1

[56] References Cited

U.S. PATENT DOCUMENTS

| | | | |
|---|---|---|---|
| 4,447,700 | 5/1984 | Cohen | 219/117.1 |
| 4,516,008 | 5/1985 | Jones | 219/110 |
| 4,628,176 | 12/1986 | Kojima et al. | 219/114 |
| 4,721,906 | 1/1988 | Fergusen et al. | 219/110 |

Primary Examiner—Clifford C. Shaw
Attorney, Agent, or Firm—Donald R. Campbell; James C. Davis, Jr.; Paul R. Webb, II

[57] ABSTRACT

To control the welding current in a resistance spot welding system, a current measurement sensor is used with a current feedback control to vary the firing angle of power devices in the primary side of the power supply. The closed-loop feedback control assures the desired current is applied independent of variations in the resistance of the welding equipment and primary line voltage variations. In the current feedback control, the commanded current, proportional error, integral error and line voltage offset are summed to derive the firing angle signal, and the power supply is adjusted until actual current equals the desired current.

8 Claims, 6 Drawing Sheets

CURRENT-LOOP FEEDBACK OF SPOT WELDING MACHINES

BACKGROUND OF THE INVENTION

This invention relates to resistance spot welders and more particularly to controlling the electrical current by provision of a current feedback control to assure the desired current is applied independent of variations in the welding equipment and line voltage.

The manufacture of jet engine and other parts requires hundreds of spot welding operations. The quality of the weld is largely dependent on the power into the spot weld, where power is the product of current squared times resistance. Since the process is influenced by the square of the current, a small perturbation in current can result in unacceptable welds. A manufacturing plant may have a dozen or more spot welding machines in production. Due to variations in these machines, welding schedules must be manually adjusted to accommodate these variations. The welding is performed based on a weld schedule, which sets the current and duration. Presently the welding equipment runs in open loop mode, that is, a current is commanded but nothing verifies it is actually applied.

The invention may be used in a system that has an adaptive control for controlling the spot welding process in real time and is capable of dealing with the numerous process parameter variations and non-linearities present in this welding process. The adaptive control adjusts the heat input to the process to compensate for electrode wear, oxidized surfaces, fit up variations and machine variations. The controller in copending allowed application Ser. No. 185,599, filed Apr. 25, 1988, "Real Time Adaptive Control for Resistance Spot Welding Process", K. B. Haefner et al, now abandoned, and continuation application Ser. No. 299,102 filed Jan. 19, 1989, embodies several unique features which allow accurate control of the process within the tight power and time constraints necessary to produce a good weld.

SUMMARY OF THE INVENTION

An object of the invention is to improve the control of a spot welding system to assure that the actual current flowing to the electrodes and workpiece is equal to the desired current called for by the heat command, and is independent of variations in the primary line voltage feeding the power supply.

Another object is to make modifications to existing hardware without the need to redesign the present hardware, and to provide a current-loop feedback control that is simple enough so plant personnel can maintain it.

The improvement is made, in a spot welding system having conductor means to deliver power pulses from a power supply to a pair of electrodes between which a workpiece is held, and a controller to determine a heat command and a commanded current to be generated by the power supply, of providing a current sensor and measuring the actual current flowing to the workpiece, and a current feedback control that adjusts the power supply output until the actual current substantially equals the commanded current independent of variations in resistance in the welding system and of the line voltage fed to the power supply. An illustrative embodiment of the welding equipment has a three phase transformer, silicon controlled rectifiers on the primary side and a full wave rectifier on the secondary side. The current is adjusted by varying the firing angle of the SCRs until the measured current equals the commanded or desired current. This embodiment has an adaptive control and calculates, in one phase of operation, a heat command at every power pulse.

The current feedback control may be comprised of means to compare commanded and actual currents and derive an error signal; means to produce a proportional error term; means to integrate the error signal and produce an integral error term; means to generate an offset signal which varies inversely with changes in line voltage about a nominal value; and means to sum the commanded current, proportional error, integral error, and line voltage offset signals to derive a power supply current command signal. After conversion of this analog signal to digital, and linearizing the conversion of current to phase angle, firing angle signals are generated and presented to the power supply.

A feature of the current feedback control is to delay activation of the integral error term producing means until after the current is actually applied. Moreover, its authority and relative weight in determining the power supply firing angle signals may be limited.

DETAILED DESCRIPTION OF THE INVENTION

Figure 1:
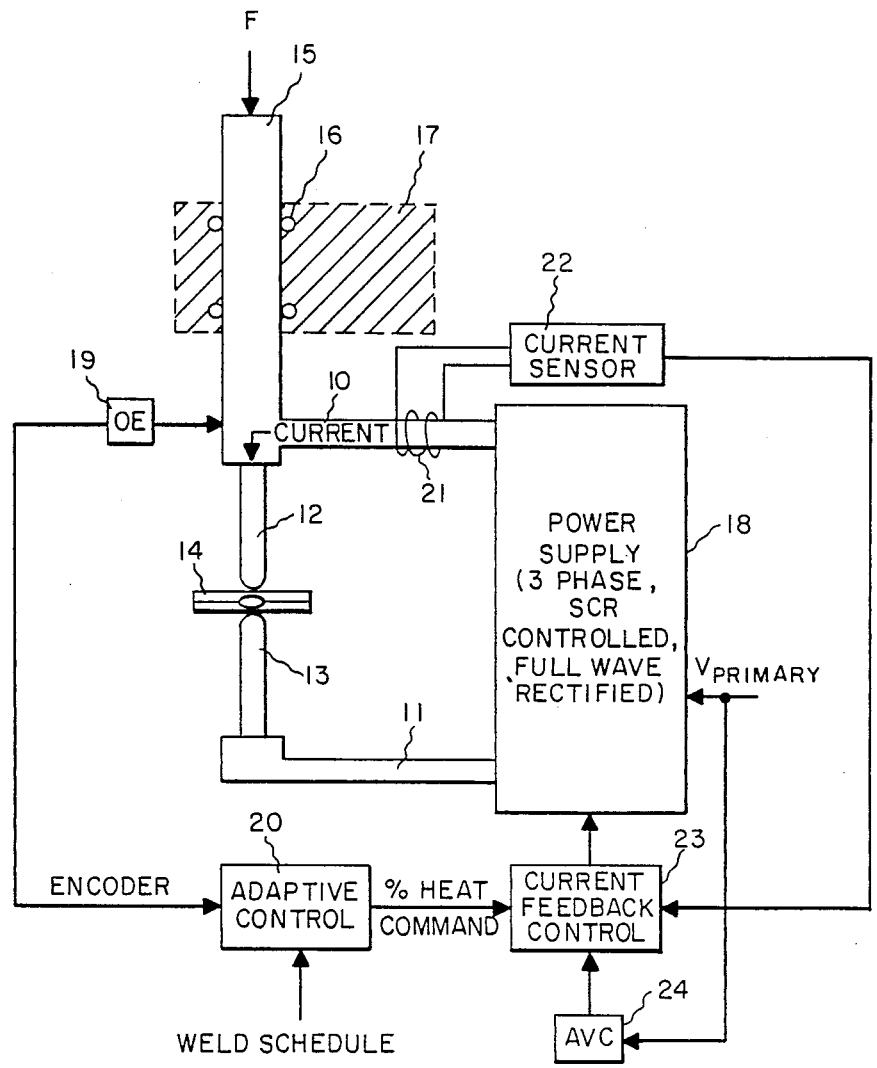
FIG. 1 shows schematically a pedestal spot welder having an adaptive controller and the current feedback control of the invention.

Referring to FIG. 1, the pedestal spot welding machine has upper and lower conductor arms 10 and 11 and electrodes 12 and 13 between which is held a workpiece 14. A typical electrode force of 1200 lbs. is produced by a load piston 15 which has bearings 16 and is supported in a frame 17. Power supply 18 has a three phase-to-three phase transformer, the primary circuit of which has three pairs of inverse-parallel, phase controlled and naturally commutated SCRs to control the current. The secondary circuit has a full wave rectifier and delivers low voltage, high amperage pulses of power to the welding machine which are passed through the workpiece where heating is produced primarily by the Joule affect and results in the formation of a weld nugget at the interface. For a 60 Hz primary line voltage, power supply 18 generates power pulses at 1/360 sec. intervals. Electrode or workpiece displacement due to thermal growth is measured at every power pulse by an optical encoder 19 or other displacement sensor.

The inputs to the computerized adaptive control 20 described in application Ser. No. 185,599 are an adaptive weld schedule and the encoder displacement measurements, and its output is the process heat command which determines a desired current to be fed to the electrodes and workpiece. Real time process control is needed to regulate the heat input to the weld joint. The spot welding machine and process has many control challenges associated with non-linearities such as those already mentioned plus others including time delays, load piston friction, workpiece expulsions, and process gain changes. The welding control has to identify the process parameter variations and provide control action within 100 milliseconds or so in order to produce a good weld. This adaptive control utilizes a least squares estimator to monitor the process and workpiece displacement, a precompensator to shape a desired displacement trajectory command, and a model reference control with a Smith-predictor to compensate for time delays and a proportional-integral-derivative compensator. The model reference control has a mathematical model of the spot welding process and calculates an estimated displacement using a predicted process gain and bias calculated by the estimator. The estimated displacement is compared to the precompensator displacement trajectory and an error is generated which regulates the heat command through the PID compensator. After an initial phase the heat command is regulated at every power pulse until a final phase is reached and maintains the heat calculated by the second phase.

There are many factors that contribute to the changes in resistance in the secondary circuit of power supply 18. In addition to those already identified, it may be emphasized that welding machines are not identical and mechanical joints in the welder become corroded, electrodes become worn, and so on. If the resistance in the secondary circuit changes, the actual current flowing to the workpiece will not be the same for a given heat command. The closed-loop current feedback control of this invention assures the desired current will be applied independent of variations in the welding equipment and line voltage. Even though the resistance in the secondary circuit is changing, a given heat command will generate the same current in the secondary.

The actual current flowing in one conductor 10 and passed to the electrodes 12 and 13 and workpiece 14 is sensed by a current measurement device such as a simple coil 21 whose output is converted to a low voltage by the current sensor electronics 22 and presented to a current feedback control 23. The percent heat command or commanded current signal is another input to the current feedback control 23, as is a line voltage offset which varies inversely with changes in the primary line voltage fed to the power supply 18 above and below a nominal value. The automatic voltage control 24 may be considered as a separate component, as shown here, or as a part of the current feedback control. Conventionally the AVC offset is summed with the heat command voltage to account for variations in line voltage. The output of current feedback control 23 is a set of SCR firing angle signals to control the current generated by the power supply. The commanded current is compared to the actual current and the current feedback control 23 adjusts the firing angle until actual current substantially equals commanded current.

Figure 2:
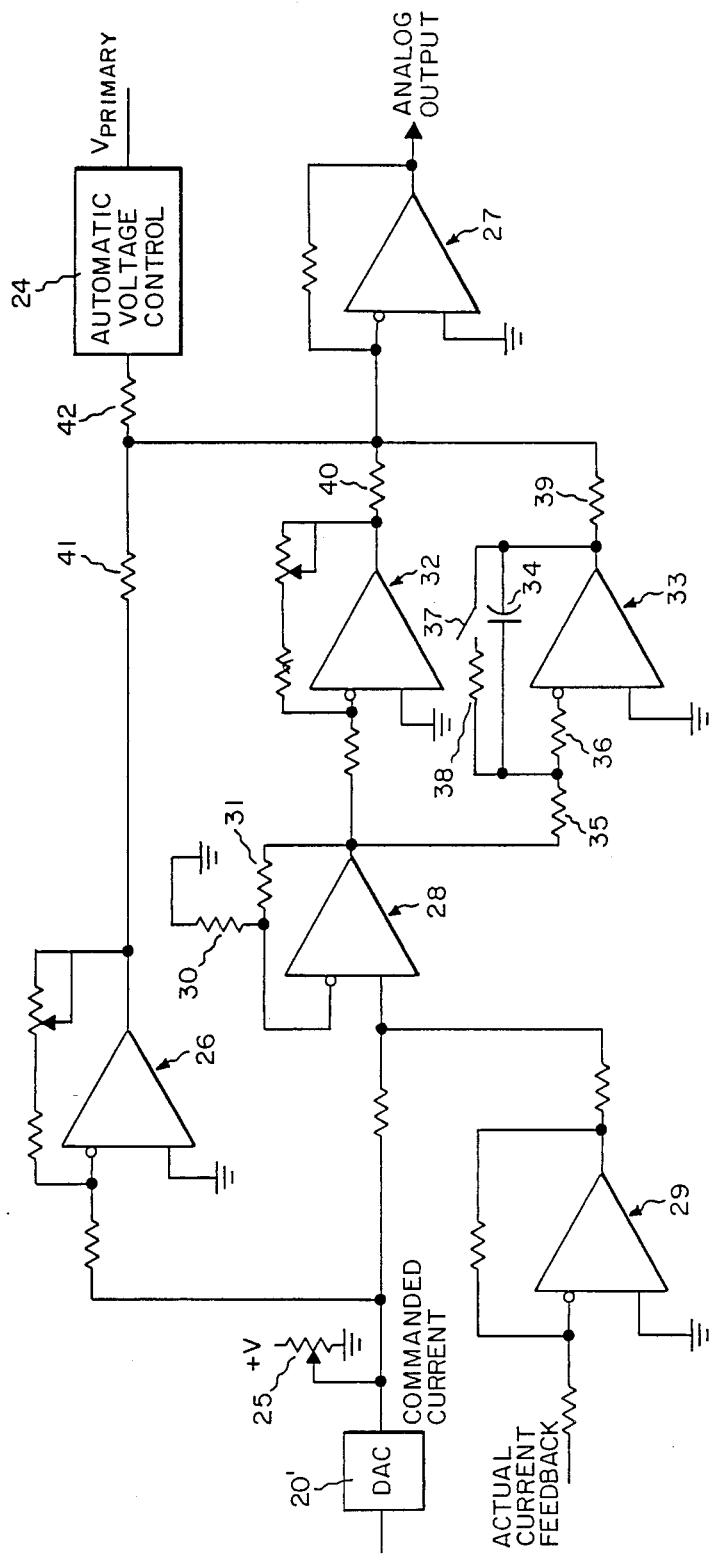
FIG. 2 is a circuit diagram of the analog circuitry of the current feedback control which generates a power supply command signal.

FIG. 2 shows the analog circuitry of current feedback control 23. This first part derives the error between commanded and actual currents, and produces proportional and integral error terms. The fed-forward current command, proportional error, integral error, and primary line voltage offset are summed to produce an analog power supply current command signal. This is later converted to digital and to the SCR firing angle signals. The analog circuit is implemented with operational amplifiers, which with the exception of the integrator have a resistance feedback circuit between the output and inverting input, and input and output resistors. With the exception of the amplifier which produces the error signal, the non-inverting operational amplifier input is referenced to ground. The percent heat command output by adaptive control 20 is a digital voltage which is converted to analog by a digital-to-analog converter 20'. The commanded current corresponding to the heat command is a voltage proportional to the desired current, and in this design one volt corresponds to 600 amps. The input that receives the commanded current signal is held at a positive potential by a potentiometer 25; this command current is fed forward to an amplifier 26 and to a summing amplifier 27. The commanded current signal is also presented to the non-inverting input of an amplifier 28. The actual current feedback signal is fed to an amplifier 29 and hence to the same input. The commanded current is compared to the actual current, producing an error signal from amplifier 28. The inverting input of this operational amplifier is held at a reference potential by connection to the junction between two series resistors 30 and 31 connected between the output terminal and ground.

The error signal is fed into amplifier 32 which produces a proportional error term. This operational amplifier has a variable resistor in the resistance feedback circuit to adjust the proportional error. In addition the error signal is fed into an amplifier 33 which generates an integral error term. This operational amplifier has a capacitive feedback 34 from the output to the junction between two input resistors 35 and 36, and a parallel resistance feedback circuit comprising a relay switch 37 in series with a resistor 38. The integrator is held to zero when not welding by the closed relay contact 37. The relay is controlled by an adjustable delay circuit shown in FIG. 3 which allows the integrator to be enabled shortly after the current is actually applied. In this mode of operation, a larger integrator gain is possible.

An offset, dependent on primary line voltage, is developed by automatic voltage control 24 which may be implemented as an operational amplifier circuit. This offset voltage biases the fed-forward commanded current signal, the output of amplifier 26, inversely with line voltage changes. As the line voltage rises above and below a nominal value the commanded current signal is respectively reduced and increased. The use of the line voltage offset results in a better current step response for changes in line voltage. The fed-forward commanded current, proportional error and integral error signals, and primary line voltage offset are summed by amplifier 27. The integrator 33 has limited authority by reason of the larger summing resistor 39 than the other summing resistors 40–42 for the other three terms. This results in a more stable control system; the relative weighting of the integral error in the analog output signal is restricted.

Figure 3:
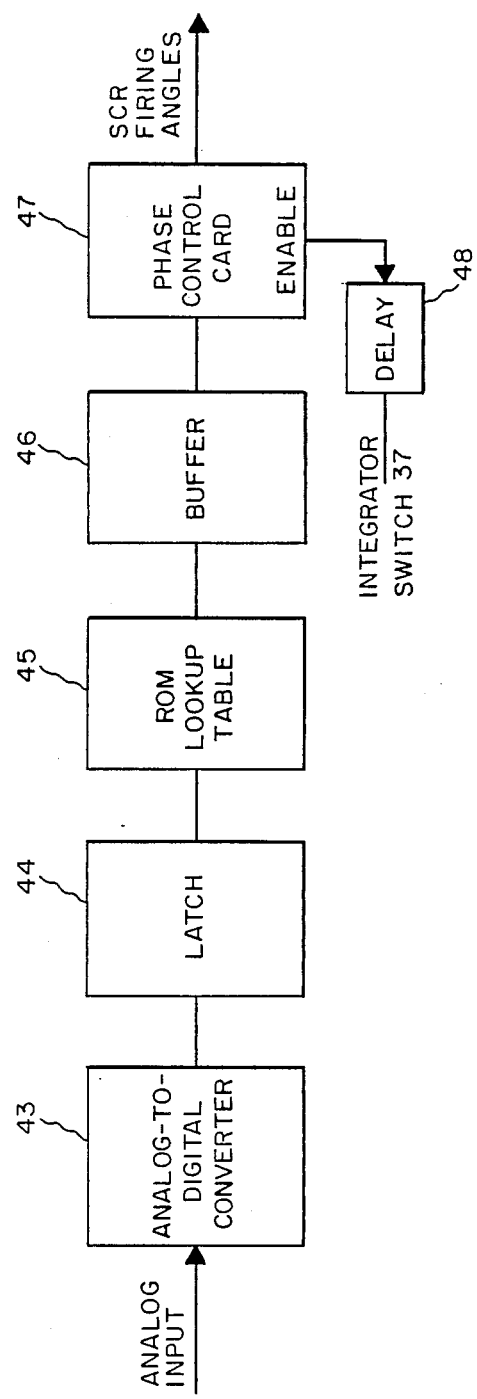
FIG. 3 is a block diagram of the digital circuitry of the current feedback control to provide power supply SCR firing angle signals.

The digital circuitry of current feedback control 23 is shown in FIG. 3. The analog input signal is converted to a 12 bit digital number by an analog-to-digital converter 43. The output of the A/D 43 is stored in a latch 44 which feeds a read-only memory lookup table 45 to linearize the mapping of current to phase angle. As the SCR firing angle is retarded up to 90° and more relative to the end of a half wave of sinusoidal voltage, there is a non-linear relationship between the increasingly retarded firing angle and current generated by the power supply. The output of ROM 45 is temporarily stored by buffer 46 before presentation of the 12 bit power supply current command signal to a phase control card 47 whose output is a set of SCR firing angles. This may be a commercially available component such as Phase Control W7185 supplied with Sciaky Bros., Inc., welding equipment. This contains six count down registers to control each one of the phases of the three phase voltage. These registers are set at each power pulse as the buffer 46 is strobed and read out. The firing angle signal causes the power supply SCRs to turn on producing a current related by a complex function to the firing angle. One advantage of this invention is that it may be implemented as an add-on device as opposed to a complete redesign of the phase control card.

Figure 4:
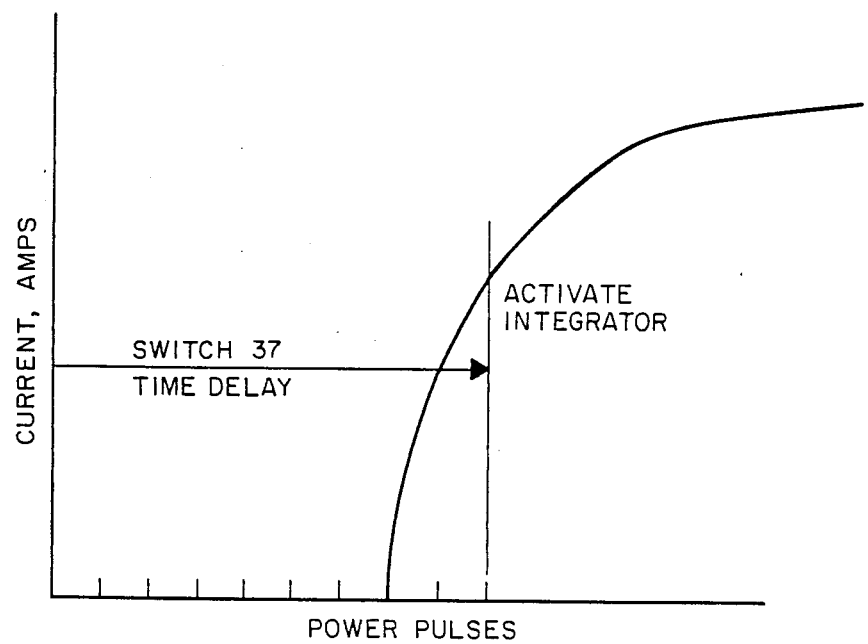
FIG. 4 shows the rise in current after the start of power pulses and the delay to activate the integrator.

The opening of relay switch 37 and activation of integrator 33 is delayed for a given number of power pulses until the current is actually applied. The strobing of a 12 bit digital power supply current command signal into phase control card 47 enables an adjustable delay circuit 48 which, after a set time delay, energizes a relay coil and opens the integrator switch 37. FIG. 4 shows that there is a delay of a few power pulses after heat enablement until the actual current begins to rise. Typically there is a delay of one power pulse in latch 44, one in buffer 46, and four or so in phase control card 47. A delay of one to two power pulses after current is actually applied is optimal. If integrator 33 is activated too soon there may be a large overshoot in current.

Figure 5:
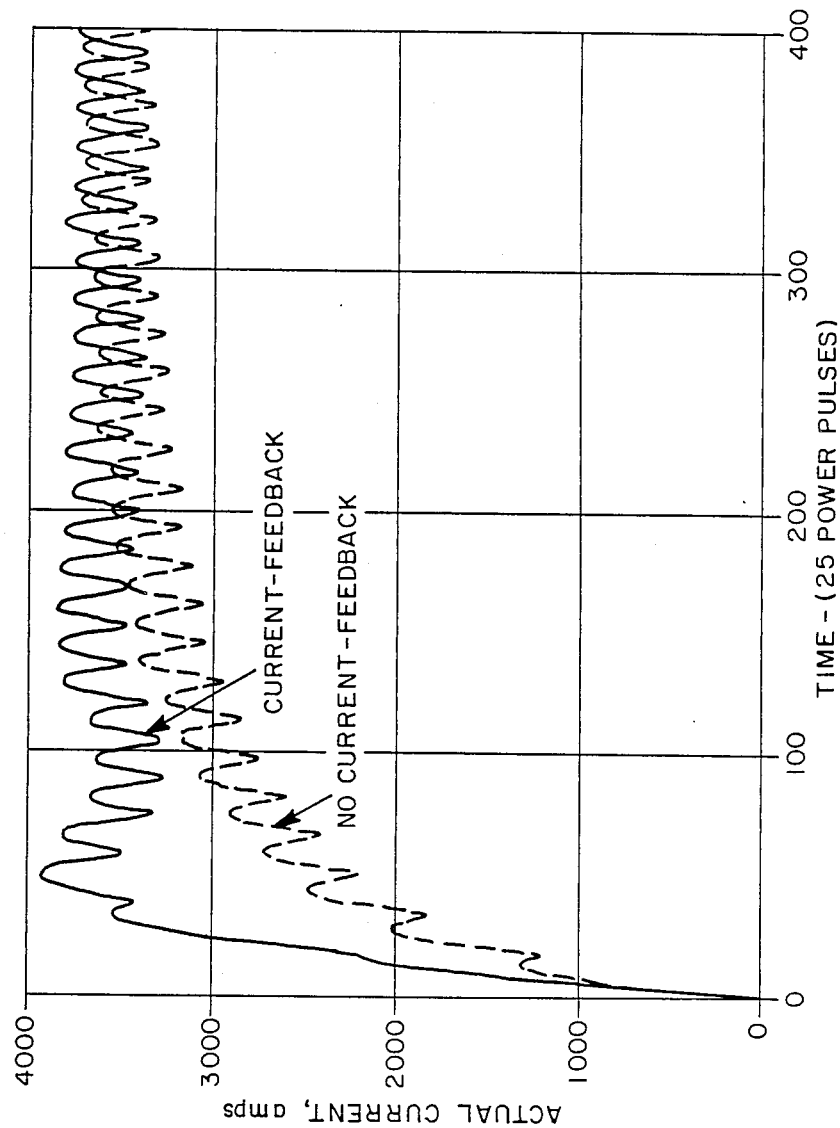
FIG. 5 has test results and shows the current response of the system with and without closed-loop feedback control.
Figure 6:
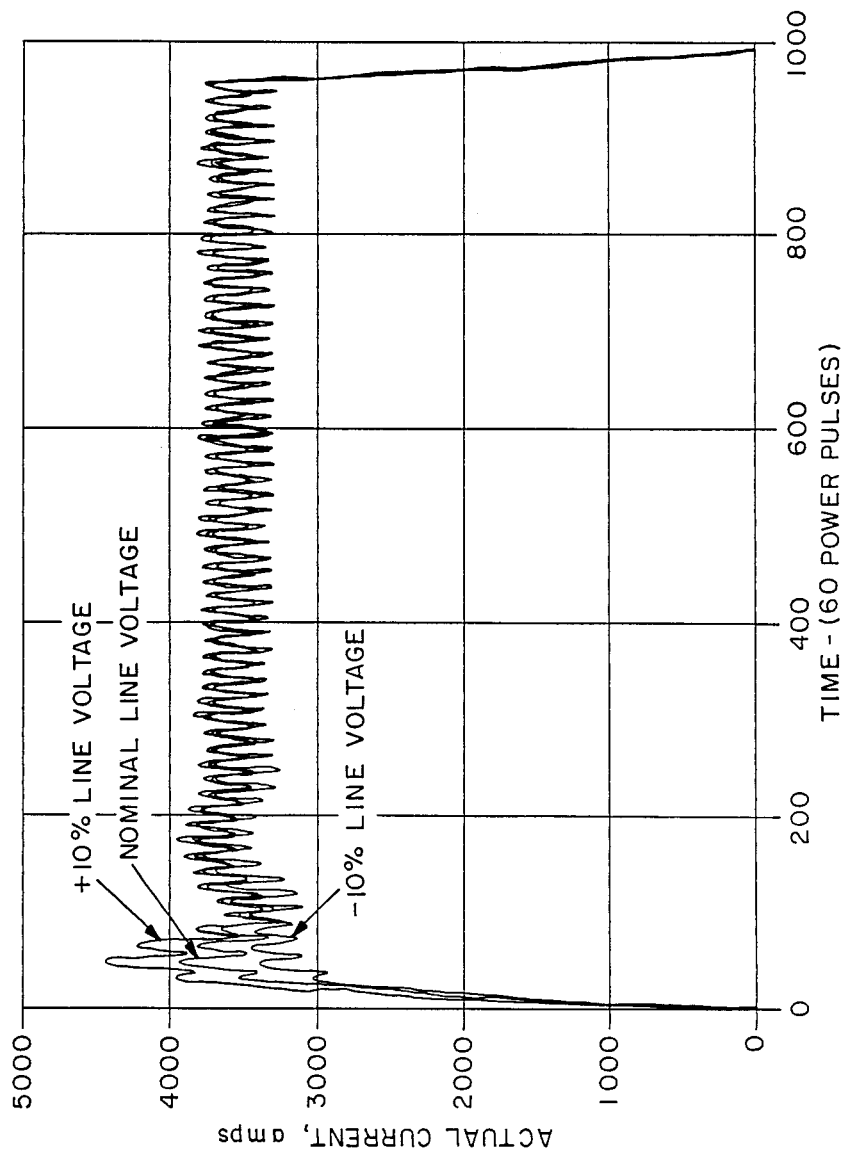
FIG. 6 shows the current response of the system with closed-loop feedback control when the line voltage is nominal and +10% high and −10% low.

The current feedback control was tested and was able to maintain current under a variety of test conditions including variations of primary line voltage of +10% and −10%, variations in setup, and variations in material thickness. The results of these tests are shown in FIGS. 5 and 6. The first graph shows the response of the system with and without closed-loop current feedback control. The second shows the response of the system with closed-loop feedback control when the line voltage is nominal, +10% high and −10% low. This demonstrates that actual current is independent of primary line voltage.

The current feedback control of this invention may be used with single phase welding machines which typically have a pair of inverse-parallel SCRs in series with the primary winding of the welding transformer. The welding machine, whether three phase or single phase, can have other adaptive controllers than the particular one described. In spot welding equipment with no adaptive control, the heat command from a computer is fed into an automatic voltage control to compensate for line voltage variations, and then into the current feedback control where the firing angle signals are produced in the same manner.

While the invention has been particularly shown and described with reference to preferred embodiments thereof, it will be understood by those skilled in the art that the foregoing and other changes in form and details may be made without departing from the spirit and scope of the invention as defined in the appended claims.

The invention claimed is:

1. In a spot welding system having conductor means to pass power pulses from a power supply to a pair of electrodes between which a workpiece is held, and means to determine a heat command and a commanded current to be generated by said power supply, the improvement which comprises:

means to measure actual current flowing to said electrodes and workpiece; and
   current feedback control means for adjusting said power supply until the actual current substantially equals the commanded current independent of variations in resistance in said welding system and variations in primary line voltage fed to said power supply;
   wherein said current feedback control means is comprised of means to compare commanded and actual current and derive an error; means to produce a proportional error term; means to integrate said error and produce an integral error term; means to generate an offset which varies inversely with changes in said primary line voltage about a nominal value; and means to sum said commanded current, proportional error and integral error terms and line voltage offset to derive an analog power supply current command.

2. The system of claim 1 further comprising means to delay activation of said means to produce an integral error term until after said actual current is applied.

3. The system of claim 1 wherein said current feedback control means is further comprised of means to convert said power supply current command to digital form; means to linearize conversion of current to phase angle; and means to generate firing angle signals which are presented to said power supply.

4. The system of claim 3 further comprising delay means which is enabled by said means to generate firing angle signals for delaying activation of the integral error term producing means until after said actual current begins to rise.

5. In a spot welding system having conductor means to pass power pulses from a power supply to a pair of electrodes between which a workpiece is held, adaptive control means to calculate at every power pulse a heat command and a commanded current to be generated by said power supply, and means to derive an offset to said heat command to compensate for variations in primary line voltage fed to said power supply, the improvement which comprises:

means to measure actual current flowing in said conductor means; and
   a current feedback control that adjusts firing angle signals which control said power supply until the actual current substantially equals the commanded current independent of variations of resistance in said welding system and variations in said primary line voltage;
   wherein said current feedback control is comprised of means to compare commanded and actual current signals and derive an error signal; means to produce from said error signal a proportional error signal; means to integrate said error signal and produce an integral error signal; and means to sum said commanded current, proportional error, and integral error signals and said line voltage offset to derive an analog power supply current command signal.

6. The system of claim 5 further comprising means to convert said power supply current command signal to a digital command; means to linearize conversion of current to phase angle; and means to generate said firing angle signals.

7. The system of claim 6 further comprising means to delay activation of said means to produce an integral error signal until after said actual current is applied.

8. The system of claim 6 further comprising means to limit the relative weighting of said integral error signal in said power supply current command signal.

* * * * *